June 14, 1927.
E. VINOGRADOV
1,632,254
WINDOW LIGHTING SYSTEM
Filed Oct. 1, 1926
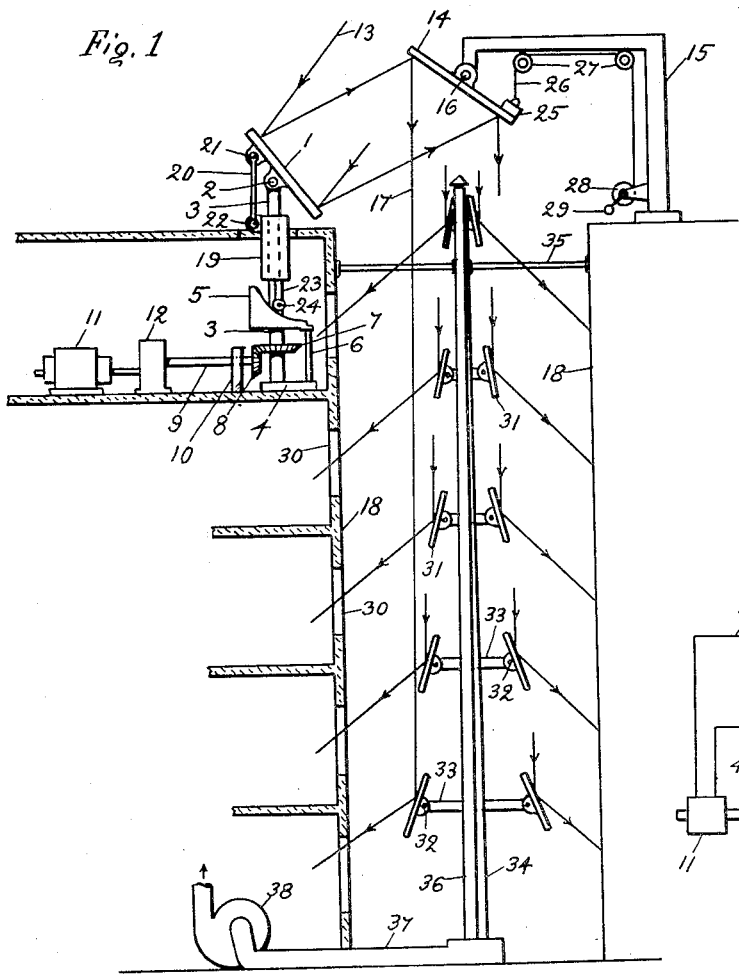
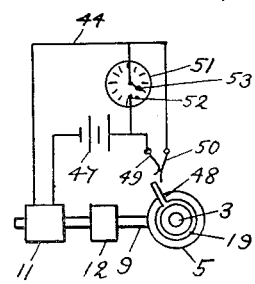
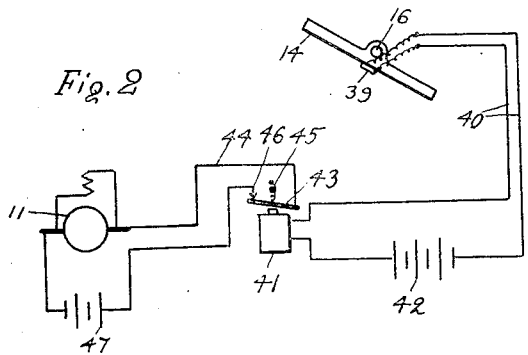
EUGENE VINOGRADOV
INVENTOR
BY John P. Wilsonow
ATTORNEY Patented June 14, 1927.

1,632,254

UNITED STATES PATENT OFFICE.

EUGENE VINOGRADOV, OF NEW YORK, N. Y.

WINDOW-LIGHTING SYSTEM.

Application filed October 1, 1926. Serial No. 138,949.

My invention relates to window lighting systems and has a particular reference to devices adapted to direct the sunlight into windows between narrow walls of large houses.

The object of my invention is to provide an automatically controlled system of mirrors adapted to deflect the sun rays vertically down the shaft between building walls, and a second system of mirrors adapted to distribute and to deflect the above vertical beam of light into windows facing the shaft.

For this purpose I provide an electric motor connected through a suitable gearing with a movable mirror. The motor continuously rotates the mirror so as to follow the sun, continuously deflecting its rays to a central mirror which in turn deflects these rays down on stationary or adjustable mirrors, one for each window.

My invention is more fully described in the accompanying specification and drawing in which—

Fig. 1 is a sectional elevation of a house with my system of mirrors, Fig. 2 is a diagrammatic view of an automatic electric control, and Fig. 3 is a diagram of connections for a clock controlled switch mechanism.

My system comprises a mirror 1 pivotally mounted on a pivot 2 on a vertical shaft 3. This shaft is journaled in a base 4 and in a cam member 5 rigidly supported with a rod 6. The shaft has a bevel gear 7 in mesh with gear 8 on a shaft 9 journaled in a bearing bracket 10. This shaft receives its rotation from an electric motor 11 through reduction gears in a housing 12. The speed of the motor is adjusted so that the mirror during the day is turned from east to west, continuously facing the sun. The sun rays 13 are reflected from the mirror 1 on a stationary adjustable mirror 14 pivotally mounted on a bracket or support 15 by means of a pivot 16. The rays 17 from this mirror are reflected vertically into the space between building walls 18.

In order to obtain the vertical direction for the rays 17 during rotation of the mirror 1, the latter is also turned on its pivot 2 in accordance with the rise and descent of the sun in the skies. For this purpose a sliding bushing 19 is mounted on the shaft 3 and is connected with the mirror 1 by means of a link 20 pivoted to the mirror 1 with a pivot 21 and to the bushing 19 with a pivot 22. The bushing 19 has a lug 23 with a roller 24 adapted to slide on the cam shaped surface of the cam member 5. The cam surface of this cam member is proportioned to the movement of the sun, so that different cam members are required for different time of the year.

The mirror 14 is weighted down on one end with a weight 25. A rope 26 is attached to this end of the mirror and is supported on sheaves 27. The other end of this rope is wound on a drum 28 with a handle 29. By means of this rope the angular position of the mirror may be adjusted in order to obtain vertical direction for the rays 17.

The rays 17 are deflected into windows 30 by means of mirrors 31 mounted with pivots 32 on brackets 33 supported by a vertical column 34. This column is braced at the top with bars 35 attached to the walls 18. The mirrors may be adjusted so as to throw the light directly into the windows, by turning them on pivots 32 and by adjusting vertical positions of brackets 33 on the column. It is preferred to direct the light rays downwards, as shown, imitating the natural direction of the sunrays when the window is directly exposed to sunlight.

A pipe 36 may be attached to the column 34 with a horizontal extension 37 connected with the intake end of a fan 38 which furnishes the fresh air to the inside of the building.

The rotation of the mirror 1 may be controlled automatically by the sunrays. For this purpose a selenium element 39 (Fig. 2) may be attached to the mirror with wires 40 leading to a relay 41 and connected with a battery or similar source of electric current 42. The armature 43 of the relay normally keeps the motor circuit 44 closed by the action of a spring 45 which tends to press it against a contact 46 thereby connecting the motor 11 with a source of electric current 47. With this arrangement the motor continues to rotate until the mirror 1 comes in a position when the sunrays strike the element 39 when the relay 41 becomes energized and disconnects the circuit 44. As soon as the sun moves to such an extent that its rays leave the element 39 the relay releases the armature 43 and the motor begins to rotate.

The motor continues to turn the mirror after the sunset and brings it back to the position to catch the rays at the sunrise. In order to prevent the motor from overtraveling this morning position an arrangement is provided illustrated in Fig. 3. The bushing 19 has a lug 48 adapted to disconnect resilient contact members 49 and 50. The motor 11 then stops, the mirror being in a position to catch the first sunrays.

In order to start the motor at a predetermined time a clock 51 is provided with a contact point 52 connected with one side of the motor circuit, the other side (wire 44) being connected to a clock hand 53. The contact point 52 may be placed at any place on the clock dial. At a certain time the hand 53 touches the contact member 52, closing the motor circuit which begins to turn the mirror. The lug 48 leaves the contact members 49 and 50 and the motor will continue to rotate the mirror at a regulated speed or controlled by the selenium relay.

Important advantages of my lighting system are that it furnishes the sunlight to rear rooms in buildings facing narrow shafts and opposite walls, thereby rendering these rooms healthy and pleasant for occupancy. It is also possible to build houses with further reduced clearances between the adjacent walls, making the rooms and apartments facing narrow inner courts more valuable.

I claim as my invention:

1. In a window lighting system, the combination with a plurality of stationary adjustable mirrors adapted to direct the sunlight into windows of a house, a movable mirror adapted to reflect the sunrays onto said stationary mirrors, means to rotate said movable mirror in a horizontal and vertical plane in accordance with the movement of the sun, means to stop said rotation when said mirror reaches a predetermined position, and means to start said rotation at a predetermined time.

2. In a window lighting system, the combination with a plurality of mirrors, means to adjustably support said mirrors outside of windows of a house, a movable mirror adapted to reflect the sun rays into said windows through said stationary mirrors, a vertical shaft pivotally supporting said movable mirror, means to rotate said shaft with said mirror, a sliding member on said shaft pivotally connected with said movable mirror, and means to raise and to lower said sliding member.

3. In a window lighting system, the combination with a mirror, a vertical shaft, said mirror being pivoted to the end of said shaft, means to rotate said shaft with said mirror, a sliding member on said shaft, a link pivotally connecting said sliding member with one side of said mirror, a stationary cam shaped member adapted to control vertical movements of said sliding member, and means to reflect the sun rays from said mirror into windows of a house.

4. In a window lighting system, the combination with a stationary vertical shaft located outside of a house near its window, a plurality of mirrors on said shaft located in opposition to windows in each story of the house, said mirrors being adapted to reflect a vertical beam of light into said windows, a directing mirror adjustably supported above said shaft and adapted to direct a straight beam of light on said mirrors on said shaft, a movable mirror mounted on the roof of said house and adapted to direct sunrays on said directing mirror, and means to move said movable mirror in accordance with the movement of the sun.

Signed at New York in the county of New York and State of New York Sept. A. D. 1926.

EUGENE VINOGRADOV.